(12) United States Patent
Kurth et al.

(10) Patent No.: US 8,893,567 B2
(45) Date of Patent: Nov. 25, 2014

(54) FLUID CONDUIT ELEMENT

(75) Inventors: Martin Kurth, Kandern (DE); Oliver Laux, Lörrach (DE); Christian Fräulin, Waldkirch (DE)

(73) Assignee: A. Raymond et Cie, Grenoble (FR)

(*) Notice: Subject to any disclaimer, the term of this patent is extended or adjusted under 35 U.S.C. 154(b) by 201 days.

(21) Appl. No.: 13/574,369

(22) PCT Filed: Jan. 20, 2011

(86) PCT No.: PCT/EP2011/050790
§ 371 (c)(1),
(2), (4) Date: Jul. 23, 2012

(87) PCT Pub. No.: WO2011/095401
PCT Pub. Date: Aug. 11, 2011

(65) Prior Publication Data
US 2012/0285571 A1    Nov. 15, 2012

(30) Foreign Application Priority Data

Feb. 4, 2010    (DE) .......................... 10 2010 006 766

(51) Int. Cl.
| G01D 21/00 | (2006.01) |
| G01N 7/00 | (2006.01) |
| F16L 41/00 | (2006.01) |
| G01D 11/30 | (2006.01) |
| G01F 15/18 | (2006.01) |
| G01L 19/00 | (2006.01) |

(52) U.S. Cl.
CPC .............. *F16L 41/008* (2013.01); *G01D 11/30* (2013.01); *G01F 15/185* (2013.01); *G01L 19/0007* (2013.01); *G01L 19/0023* (2013.01); *G01L 19/003* (2013.01)
USPC ......................................... 73/866.5; 73/61.47

(58) Field of Classification Search
CPC ... F16L 37/144; F16L 37/088; F16L 37/1225; G01K 1/08; G01L 19/003; G01L 19/0023
USPC ............... 73/204.11, 116.01, 863.81, 861.41, 73/204.12–204.15, 204.22–204.23, 73/204.26, 19.01, 19.1, 53.01, 73/61.41–61.44, 61.71, 67.76, 64.66; 137/554; 324/665, 690, 450
See application file for complete search history.

(56) References Cited

U.S. PATENT DOCUMENTS

| 6,003,381 A | 12/1999 | Kato |
| 6,076,551 A | 6/2000 | Miyazoe |
| 6,488,320 B1 * | 12/2002 | Anderson ..................... 285/319 |

(Continued)

FOREIGN PATENT DOCUMENTS

| DE | 19834212 A1 | 2/2000 |
| DE | 10108199 A1 | 8/2002 |

(Continued)

*Primary Examiner* — Peter Macchiarolo
*Assistant Examiner* — Anthony W Megna Fuentes
(74) *Attorney, Agent, or Firm* — Faegre Baker Daniels LLP

(57) ABSTRACT

A fluid conduit element having a measurement apparatus receptacle is configured to receive a sensor unit wherein there is an insert sleeve which reaches through a receptacle gap designed in a carrier base and connects a flow channel to the sensor unit. The insert sleeve is sealed against the measurement apparatus receptacle by a sealing unit, The design is characterized by a relatively simply and operationally securely effected assembly.

7 Claims, 7 Drawing Sheets

(56) References Cited

U.S. PATENT DOCUMENTS

| | | |
|---|---|---|
| 6,494,088 B2 | 12/2002 | Albert et al. |
| 6,619,140 B2 | 9/2003 | Kitahara et al. |
| 6,921,275 B2 | 7/2005 | Rehmann et al. |
| 8,002,315 B2 * | 8/2011 | Engle et al. ............ 285/305 |
| 8,593,162 B2 * | 11/2013 | Nakamura et al. ........ 324/663 |
| 2003/0025325 A1 | 2/2003 | Rehmann et al. |
| 2005/0193809 A1 | 9/2005 | Matsumura et al. |
| 2007/0212912 A1 | 9/2007 | Osborne et al. |

FOREIGN PATENT DOCUMENTS

| | | |
|---|---|---|
| DE | 10117731 C1 | 1/2003 |
| DE | 60112002 T2 | 4/2006 |
| DE | 69832460 T2 | 7/2006 |
| DE | 202006016186 U1 | 3/2008 |
| EP | 1930710 A2 | 6/2011 |

* cited by examiner

FLUID CONDUIT ELEMENT

CROSS-REFERENCE TO RELATED APPLICATION

This application is a U.S. National Phase Patent Application based on International Application No. PCT/EP2011/050790 filed Jan. 20, 2011, which is based on German Patent Application No. 10 2010 006 766.0 filed Feb. 4, 2010, the entire disclosures of which are hereby explicitly incorporated by reference herein.

BACKGROUND OF THE INVENTION

1. Field of the Invention

The present invention relates to a fluid conduit element.

2. Description of the Related Art

One known fluid conduit element is disclosed in US 2007/0212912 A1. The prior fluid conduit element has a flow-through body that comprises a through-channel and on which is mounted a case-shaped measurement apparatus receptacle. The measurement apparatus receptacle is provided with a pot-type case part that is connected in one piece to the flow-through body, and with a cover part that seals the case part. Disposed in the case part is a measurement apparatus comprising a sensor unit that is operative to measure at least one measurement value assigned to a fluid flowing through the through-channel. For this purpose, disposed between the through-channel and the case part is a flow-through opening through which the fluid flowing through the through-channel can enter the case part.

SUMMARY OF THE INVENTION

The present invention provides a fluid conduit element that can be assembled relatively easily and reliably.

Owing to the presence of an insert sleeve that is disposed fluid-tightly, by means of the sealing unit, in a receiving opening formed in a support plate of the measurement apparatus receptacle, said insert sleeve being sealingly connected to the sensor unit, the assembly of the fluid conduit element is made very simple and reliable to perform, since large-area seals are eliminated. Instead, the fluid to be measured with the sensor unit passes directly from the through-channel through the sampling channel to the sensor unit without it being necessary to fill relatively large spaces with the fluid, and consequently to seal them.

In one form thereof, the present invention provides a fluid conduit element having a flow-through body that comprises a through-channel and on which a measurement apparatus receptacle is mounted, and, disposed in the measurement apparatus receptacle, a measurement apparatus that includes a sensor unit and by means of which at least one measurement value assigned to a fluid flowing through the through-channel can be measured, characterized in that the measurement apparatus receptacle includes a support plate having a receiving opening; in that an insert sleeve is present that has a sampling channel and is disposed in the receiving opening and opens by a fluid end into the through-channel; in that a sealing unit is present by means of which the insert sleeve can be sealed with respect to the measurement apparatus receptacle; and in that the sensor unit is fluid-tightly connected to a sensor end of the insert sleeve that faces away from the fluid end.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
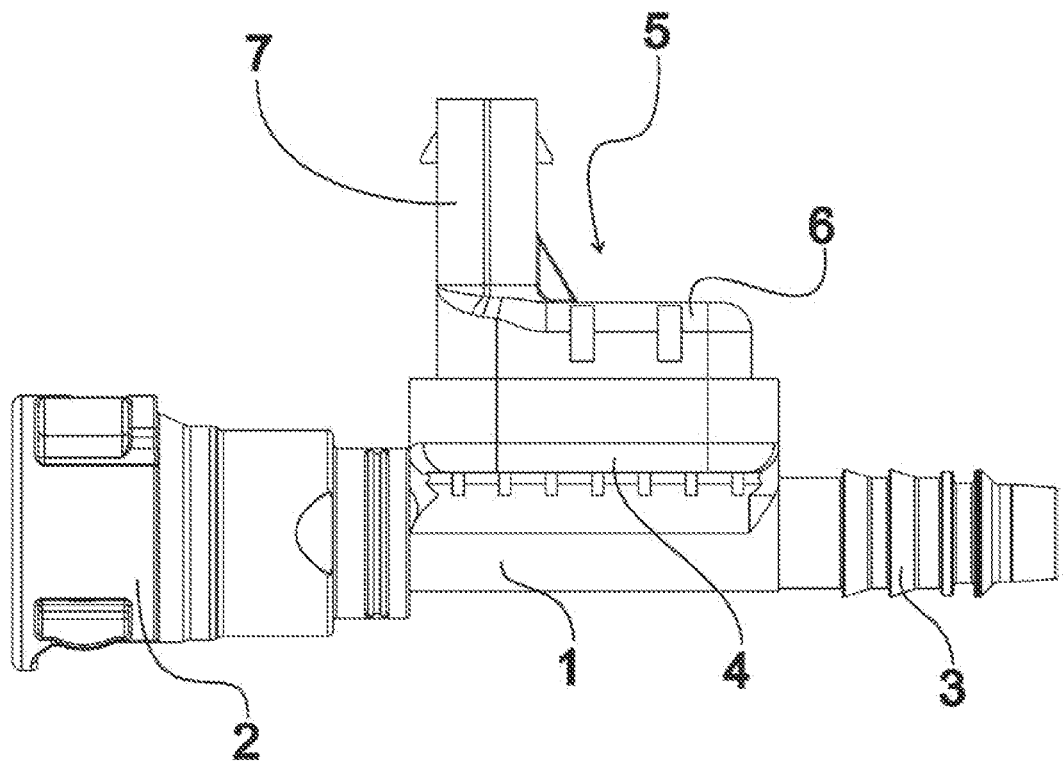
FIG. 1 is a side view of an exemplary embodiment of a fluid conduit element according to the invention, comprising a plug connector and a hose connector.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a fluid conduit element according to the invention, having an elongate flow-through body 1. In the exemplary embodiment of FIG. 1, formed on the flow-through body 1 are a plug connector 2 and a hose connector 3, to integrate the fluid conduit element into a fluid conduit system not shown in FIG. 1. The plug connector 2 serves to connect an insert part (not shown in FIG. 1) fluid-tightly and latchingly to the flow-through body 1, whereas the hose connector 3 is shaped to be inserted into a hose (not shown in FIG. 1) of the fluid conduit system.

Between the plug connector 2 and the hose connector 3, the fluid conduit element comprises, as an element of a measurement apparatus receptacle, a carrier base 4 formed in one piece with the flow-through body 1. The fluid conduit element according to the invention further comprises, as another element of a measurement apparatus receptacle, an attachment 5 that has a cap portion 6 fitted into the carrier base 4 and, formed on said cap portion 6, a connecting portion 7 that extends away approximately perpendicularly to the flow-through body 1.

Figure 2:
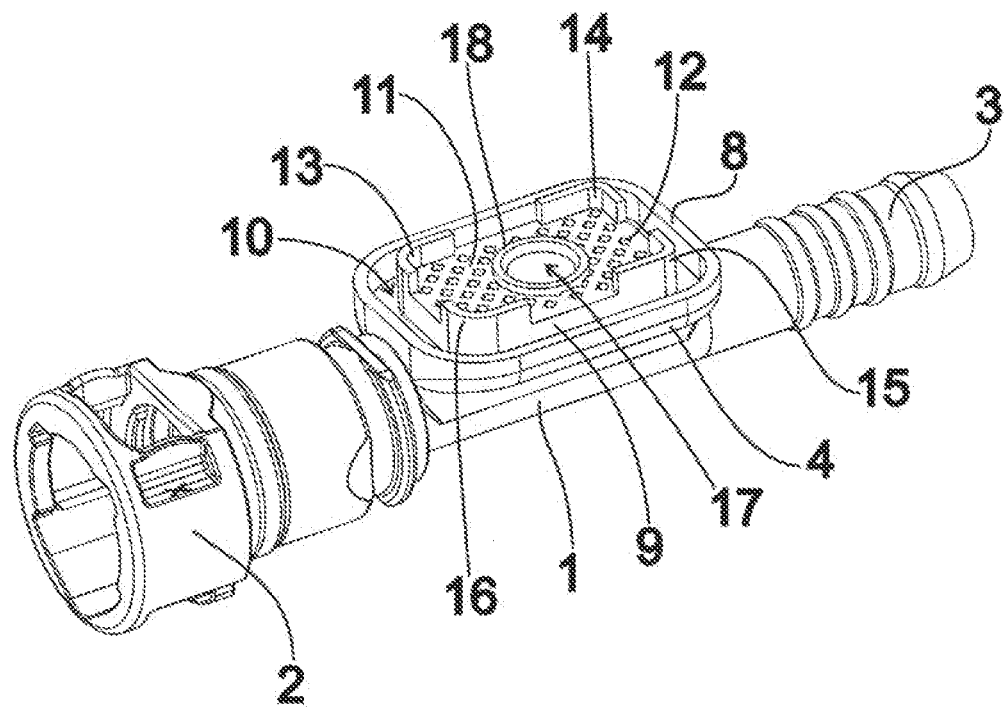
FIG. 2 is a perspective view of a flow-through body of the fluid conduit element according to FIG. 1, with a support plate that is formed on the flow-through body in one piece therewith.

FIG. 2 is a perspective view of the flow-through body 1 of the exemplary embodiment according to FIG. 1 directed at the top side of the carrier base 4, i.e., the side facing away from the flow-through body 1. It is apparent from FIG. 2 that the carrier base 4 has an outwardly circumferential outer wall 8 and an inner wall 9 that extends circumferentially at a distance from said outer wall 8, a circumferential receiving slot 10 being formed between the outer wall 8 and the inner wall 9.

The inner wall 9 surrounds an approximately rectangular, flat support plate 11, which for production engineering reasons has a number of perforations 12 extending from it toward the flow-through body 1 and configured as blind holes. Formed in corner regions of the support plate 11 are L-shaped support webs 13, 14, 15, 16, which extend away from the support plate 11 on the side facing away from the flow-through body 1. In the center of the support plate 11 there is a receiving opening 17, which is surrounded by an annular bead 18 that protrudes slightly above the support plate 11.

Figure 3:
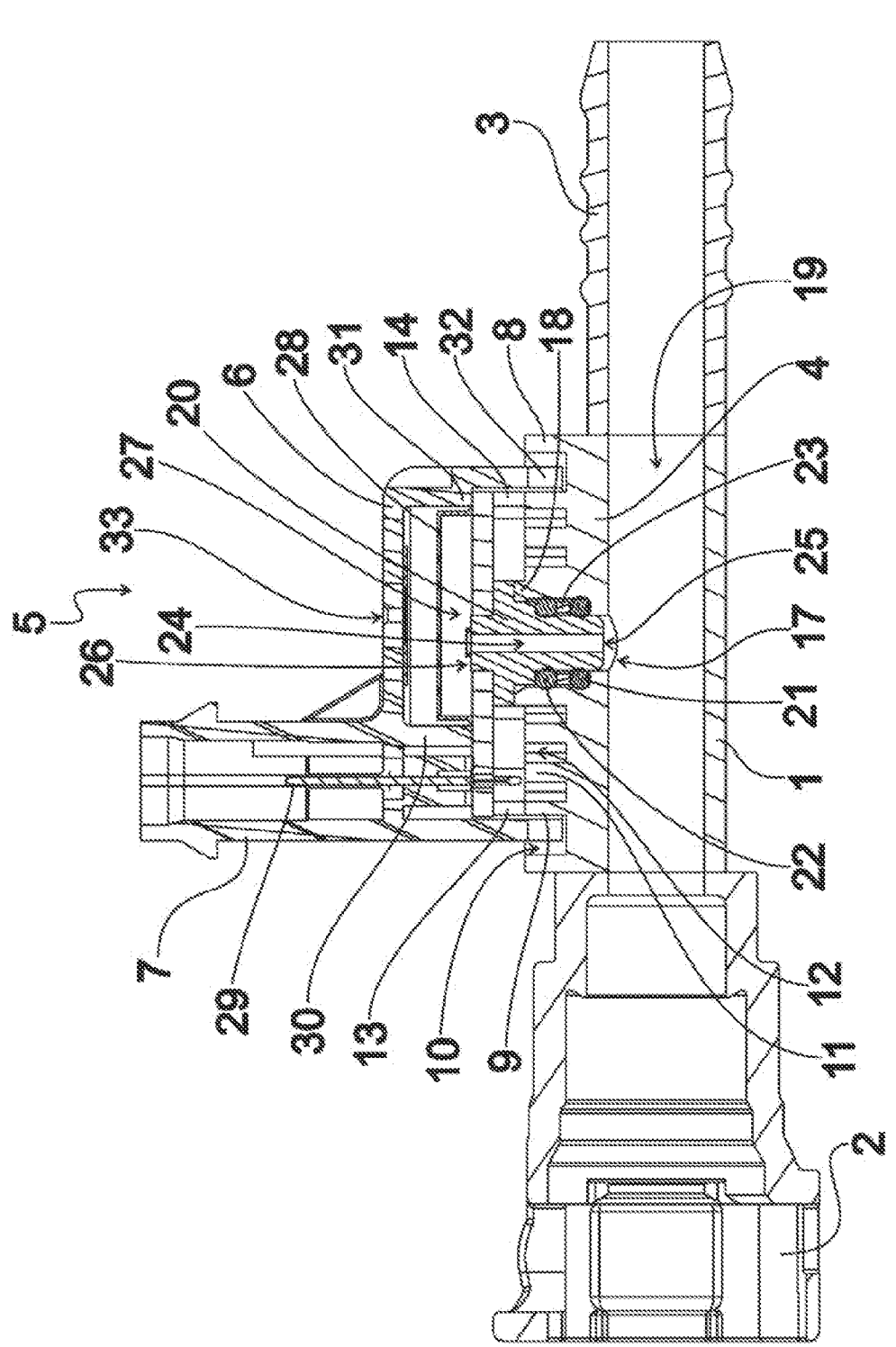
FIG. 3 is a longitudinal section of the exemplary embodiment according to FIG. 1.

FIG. 3 is a longitudinal section of the exemplary embodiment according to FIG. 1 and FIG. 2, in the arrangement according to FIG. 1. It can be seen from FIG. 3 that extending through the flow-through body 1 is a flow-through channel 19, through which a fluid flowing through a fluid conduit system (not shown in the illustration of FIG. 3) is able to flow. The receiving opening 17 extends through the support plate 11, there being in said receiving opening 17 an insert sleeve 20 that is arranged fluid-tightly in said receiving opening 17 by means of a sealing unit formed, in the exemplary embodiment of FIG. 1 to FIG. 3, by two sealing rings 21, 22 and a spacer ring 23 disposed between said sealing rings 21, 22. The insert sleeve 20 is provided with a throughpassing sampling channel 24 that opens at a fluid end 25 of the insert sleeve 20 into flow-through channel 19.

Resting on a sensor end 26 of the insert sleeve 20 disposed oppositely from the fluid end 25 of said insert sleeve 20 is a sensor unit 27, as an element of a measurement apparatus, which also rests by its edges on the support webs 13, 14, 15, 16. The sensor unit 27 is equipped with at least one sensor, by means of which a fluid flowing through the flow-through channel 19 and entering the sampling channel 24 can be measured by means of at least one measurement value assigned to it, for instance pressure, temperature, electrical conductivity or other characteristics.

On its side facing away from the carrier base 4, sensor unit 27 is covered by a protective hood 28 in an area that is relatively sensitive to external environmental influences, whereas in an exposed area, a number of contact pins 29 are present that are mechanically and electrically connected to the sensor unit 27, project into the connecting portion 7 and are connectable by means of a plug connector (not shown in FIG. 3) provided to interconnect the sensor unit 27 with a detection apparatus (not shown in FIG. 3).

The cap portion 6 of the attachment 5 comprises abutment webs 30, 31, which extend toward the sensor unit 27 and which, when the attachment 5 is arranged as intended on the support base 4, rest on the sensor unit 27 and secure it. In this intended arrangement of the attachment 5, a circumferential immersing wall 32 engages in the receiving slot 10, with the result that in the exemplary embodiment according to FIG. 3, once the empty space then present in the receiving slot 10 has been filled with an adhesive compound, the attachment 5 is fixedly connected to the support base 4.

The height of the immersing wall 32 is so calculated that it does not touch the bottom of the receiving slot 10 after the attachment 5 is mounted. This ensures that the sensor unit 27 is received between the abutment webs 30, 31 and the support webs 13, 14, 15, 16 without play and without gaps. This prevents vibration-induced damage to the sensor unit 27 and to the connections of the contact pins 29, which are fixedly joined to the sensor unit 27.

In this arrangement, the space enclosed by the attachment 5 is in communication with the external environment through an equalizing opening 33 formed in the cap portion 6, particularly in order to equalize the pressure between the external environment and the space enclosed between the abutment webs 30, 31 and the cover side of the cap portion 6.

Figure 4:
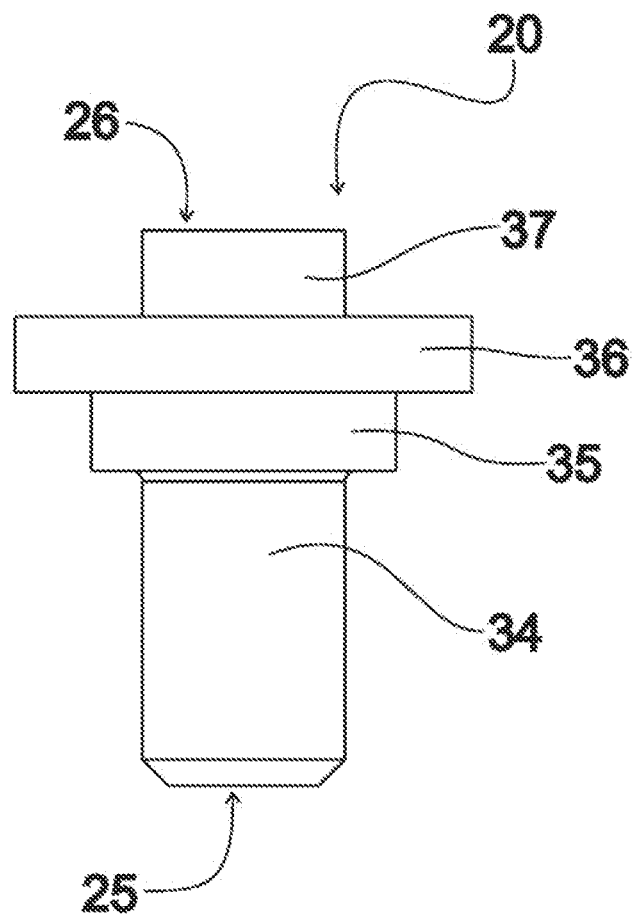
FIG. 4 is a side view of an embodiment of an insert sleeve for a fluid conduit element according to the invention.

FIG. 4 is a side view of the insert sleeve 20 from the exemplary embodiment according to FIG. 3. The insert sleeve 20 is configured with a substantially cylindrical immersing portion 34 that extends from the fluid end 25 toward the sensor end 26. Disposed on the side of immersing portion 34 facing away from fluid end 25 is a spacer ring 35, which is larger in diameter than immersing portion 34 and which forms an abutment in the form of a pressure-applying step for the sealing unit (not shown in FIG. 3), whereas the other abutment is configured as a stop step in the receiving opening 17.

On the side of the spacer ring 35 facing away from the fluid end 25, insert sleeve 20 is provided with a support plate 36, which is larger in diameter than the spacer ring 35 and which rests on the annular bead 18 when insert sleeve 20 is arranged as intended. Finally, insert sleeve 20 is provided on the side of the support plate 36 facing away from the fluid end 25 with a sensor portion 37, which is smaller in diameter than the support plate 36 and, in particular, is configured in the same manner as the insert portion 34. Shaping the insert sleeve 20 in this way makes it easy to establish communication between the sensor unit 27 and a fluid flowing in the flow-through channel 19.

Figure 5:
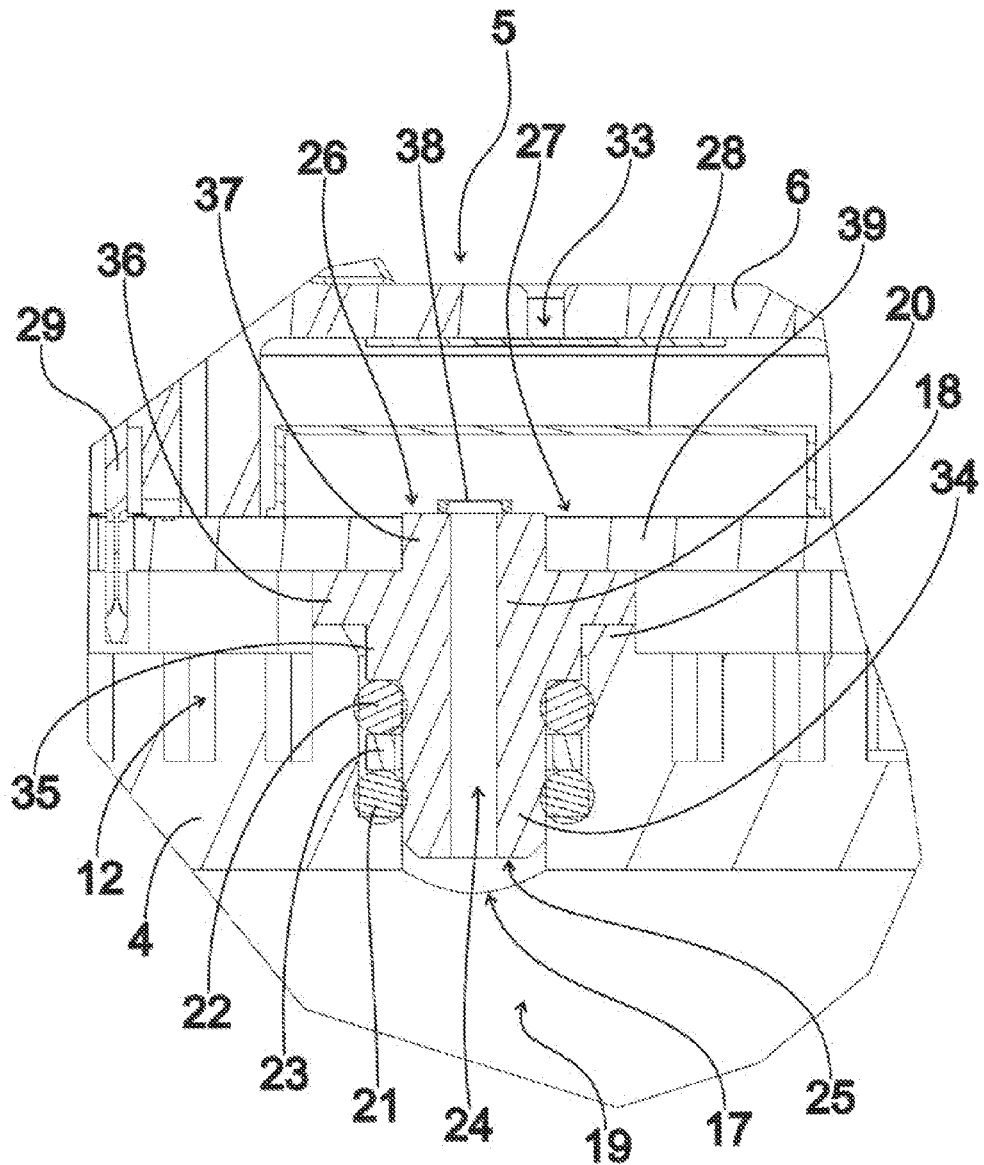
FIG. 5 is a detailed sectional view of the exemplary embodiment according to FIG. 1 to FIG. 4 in the region of the insert sleeve.

FIG. 5 is a detailed sectional view of the exemplary embodiment according to FIG. 1 to FIG. 4 in the region of the insert sleeve 20. It is apparent from FIG. 5 that the sealing rings 21, 22 surround the immersing portion 34 of the insert sleeve 20 and seal it with respect to the carrier base 4. It can also be understood from FIG. 5 that in the region of the sensor end 26 there is a sensor chip 38 that is part of the sensor unit 27 and that seals the sampling channel 24 fluid-tightly. The sensor chip 38 is electrically connected to a circuit board 39 of the sensor unit 27 that is pierced by the sensor portion 37 of the insert sleeve 20, and is implemented for example as a pressure sensor, to measure the static pressure of a fluid flowing in the flow-through channel 19.

In this way, it is merely necessary to seal the insert sleeve 20 with respect to the environment, which greatly facilitates the assembly of the fluid conduit element according to the invention and ensures high reliability even under harsh operating conditions.

Figure 6:
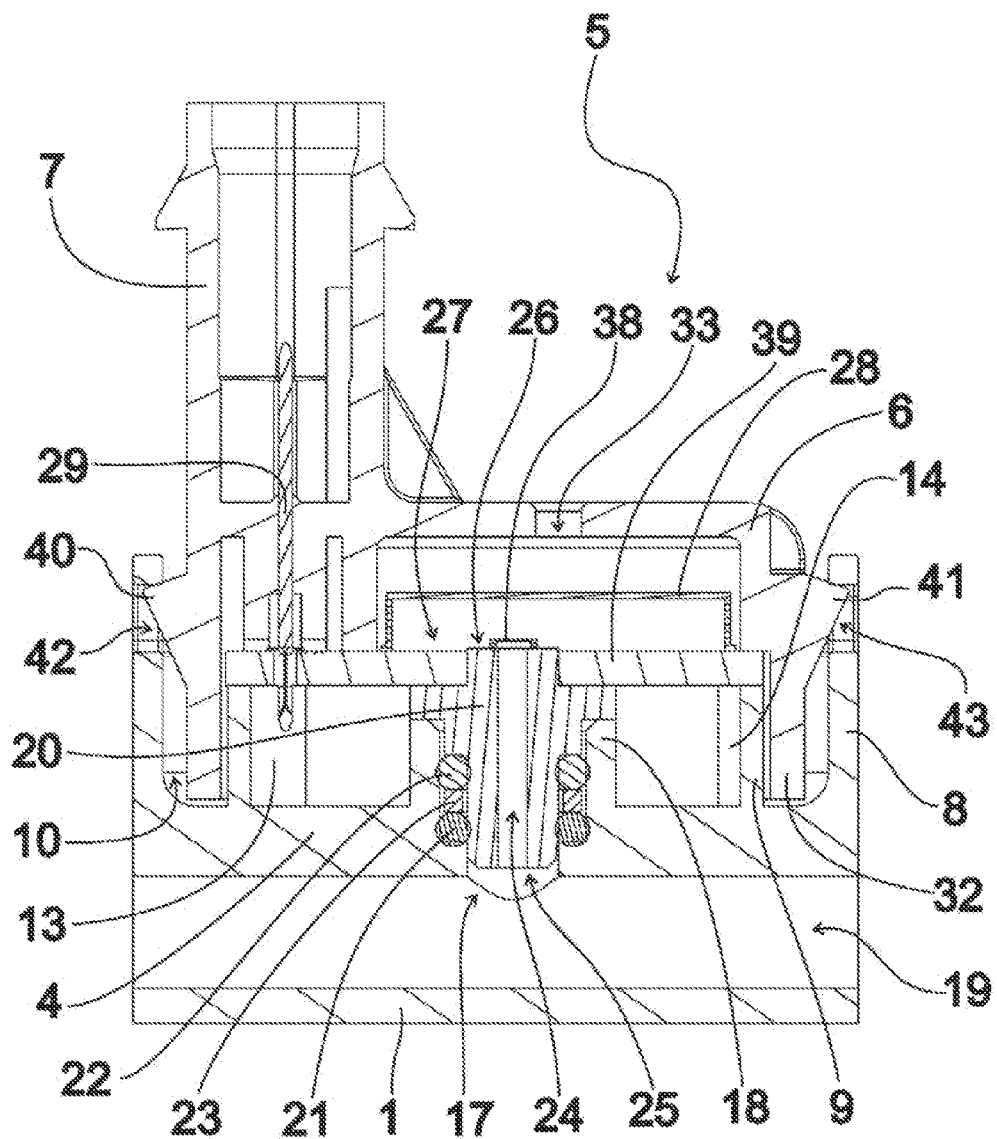
FIG. 6 is a detailed sectional view of another exemplary embodiment of a fluid conduit element according to the invention, in which a cap portion is connected to a carrier base via a latching connection.

FIG. 6 is a detailed longitudinal section of another exemplary embodiment of a fluid conduit element according to the invention, it being noted that like elements in the exemplary embodiment described with reference to FIG. 1 to FIG. 5 and the exemplary embodiment according to FIG. 6 are provided with the same reference numerals and will not be described more closely below. In the exemplary embodiment according to FIG. 6, which has a much thinner carrier base 4 than the exemplary embodiment of FIG. 1 to FIG. 5, a number of locking hooks 40, 41 of a latching device are formed on the attachment 5 and, when the attachment 5 is arranged as intended on the carrier base 4, engage in locking recesses 42, 43 of the latching device that are formed in the outer wall 8 of the carrier base 4 and thereby secure the attachment 5, alternatively or in addition to adhesive bonding to the carrier base 4.

Figure 7:
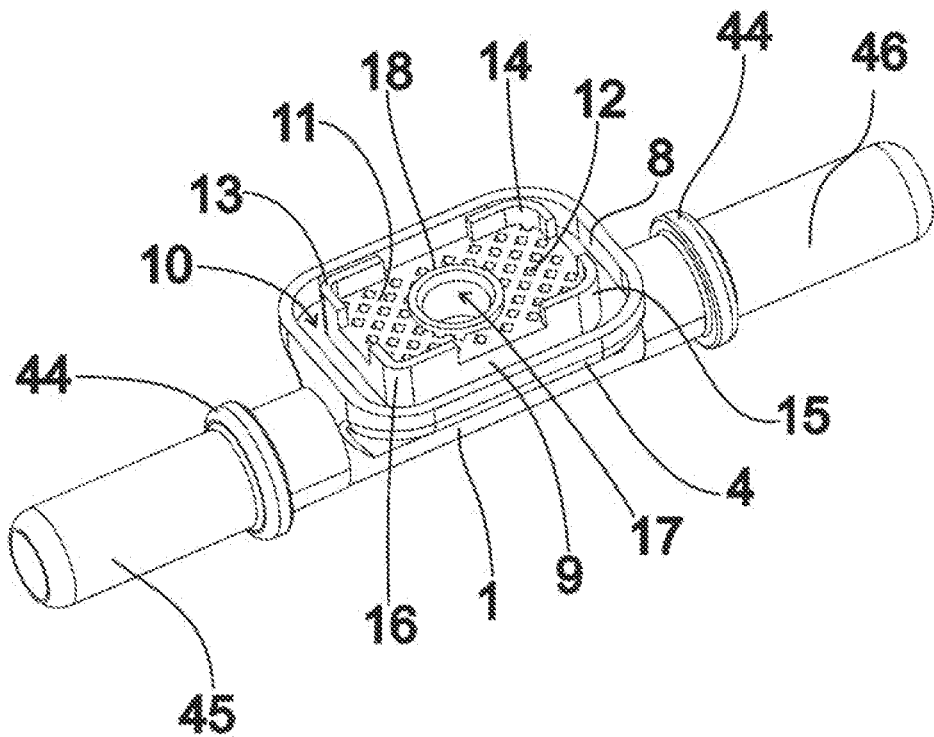
FIG. 7 is a perspective view of another exemplary embodiment of a flow-through body for a fluid conduit element according to the invention.

FIG. 7 is a perspective view of another exemplary embodiment of a fluid conduit element according to the invention, showing a flow-through body 1, on which, to effect connection at each of the opposite ends of said flow-through body 1 to a fluid conduit system not shown in FIG. 7, are provided respective insert parts 45, 46 each configured with a fully circumferential annular collar 44 and able to be inserted in the plug connectors 2 of the fluid conduit system. It is understood that with respect to other, not illustrated exemplary embodiments of flow-through bodies 1 for fluid conduit elements according to the invention, said flow-through bodies can also include a plug connector 2 and an insert part 45, 46, or a hose connector 3 comprising an insert part 45, 46, for making the connection to a fluid conduit system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fluid conduit element, comprising:
    a flow-through body including a through-channel and a measurement apparatus receptacle, said measurement apparatus receptacle including a support plate having a receiving opening;
    a measurement apparatus disposed in said measurement apparatus receptacle, said measurement apparatus comprising:
        a sensor unit adapted to measure at least one measurement value assigned to a fluid flowing through said through-channel;
        an insert sleeve disposed in said receiving opening and including a sampling channel having a fluid end opening into said through-channel, said sensor unit connected to a sensor end of said insert sleeve that faces away from said fluid end; and
        a sealing unit sealing said insert sleeve with respect to said measurement apparatus receptacle; and
    said measurement apparatus receptacle further including:
        an outer wall and an inner wall that delimit a receiving slot;
        an attachment having an immersing wall that immerses in said receiving slot; and
        a plurality of abutment webs in abutment with said sensor unit.

2. The fluid conduit element of claim 1, wherein said sealing unit is disposed between a stop step formed in said receiving opening and a pressure-applying step formed on said insert sleeve.

3. The fluid conduit element of claim 2, wherein said sealing unit includes a pair of sealing rings and a spacer ring disposed between said sealing rings.

4. The fluid conduit element of claim 1, wherein said support plate includes a plurality of support webs supporting said sensor unit.

5. The fluid conduit element of claim 1, wherein said attachment is connected to said flow-through body by a latching device including a plurality of locking hooks.

6. The fluid conduit element of claim 1, wherein said sensor unit comprises a circuit board and a sensor chip, said insert sleeve extending through said circuit board and said sensor chip sealing said sampling channel proximate said sensor end.

7. The fluid conduit element of claim 1, wherein said flow-through body includes at least one connection structure selected from the group consisting of:
    a connecting end adapted to receive a plug connector end;
    a hose connector; and
    a plug connector end for a fluid conduit coupling, and combinations of the foregoing.

* * * * *